US009179251B2

(12) United States Patent  (10) Patent No.: US 9,179,251 B2
Zelinka et al.  (45) Date of Patent: Nov. 3, 2015

(54) SYSTEMS AND TECHNIQUES FOR COLOCATION AND CONTEXT DETERMINATION

(71) Applicant: Google Inc., Mountain View, CA (US)

(72) Inventors: Stephen David Zelinka, Los Gatos, CA (US); Mohammed Waleed Kadous, Santa Clara, CA (US); Marc Stogaitis, San Mateo, CA (US)

(73) Assignee: Google Inc., Mountain View, CA (US)

( * ) Notice: Subject to any disclaimer, the term of this patent is extended or adjusted under 35 U.S.C. 154(b) by 92 days.

(21) Appl. No.: 14/026,690

(22) Filed: Sep. 13, 2013

(65) Prior Publication Data

US 2015/0080011 A1  Mar. 19, 2015

(51) Int. Cl.
*H04W 4/02* (2009.01)
(52) U.S. Cl.
CPC ........................................ *H04W 4/02* (2013.01)
(58) Field of Classification Search
CPC ........... H04M 3/00; H04W 64/00; H04B 7/00
USPC ...................................... 455/418, 41.2, 456.1
See application file for complete search history.

(56) References Cited

U.S. PATENT DOCUMENTS

| | | | |
|---|---|---|---|
| 6,359,587 B1 * | 3/2002 | Sugiura et al. | 342/457 |
| 7,509,093 B2 | 3/2009 | Persson et al. | |
| 8,718,682 B2 * | 5/2014 | Brownworth | 455/456.5 |
| 2007/0287473 A1 * | 12/2007 | Dupray | 455/456.1 |
| 2009/0201850 A1 * | 8/2009 | Davis et al. | 370/328 |
| 2011/0177802 A1 * | 7/2011 | Gupta | 455/418 |
| 2013/0057394 A1 | 3/2013 | Andiappan et al. | |
| 2013/0281118 A1 * | 10/2013 | Lipman et al. | 455/456.1 |
| 2014/0064112 A1 * | 3/2014 | Das et al. | 370/252 |

FOREIGN PATENT DOCUMENTS

| | | |
|---|---|---|
| EP | 2214381 A1 | 8/2010 |
| EP | 2264988 A1 | 12/2010 |
| EP | 2571292 A1 | 3/2013 |
| WO | 2011088470 A1 | 7/2011 |

* cited by examiner

*Primary Examiner* — Kashif Siddiqui
*Assistant Examiner* — Minjung Kim
(74) *Attorney, Agent, or Firm* — McDonnell Boehnen Hulbert & Berghoff LLP (57) ABSTRACT

Methods and systems for grouping computing devices together based on the devices being colocated with one another or being associated with complementary usage contexts, and then using the location or usage context of one device in the group to estimate the location or usage context of another device in the group are described. An example method may include receiving first sensor data from sensors of a first computing device; receiving second sensor data from sensors of a second computing device; determining, based on the received sensor data, that the first and second computing devices are colocated with one another; identifying, based on the first sensor data, a context associated with the first computing device; and determining, based at least in part on the context associated with the first computing device, a context associated with the second computing device.

14 Claims, 6 Drawing Sheets

SYSTEMS AND TECHNIQUES FOR COLOCATION AND CONTEXT DETERMINATION

BACKGROUND

Unless otherwise indicated herein, the materials described in this section are not prior art to the claims in this application and are not admitted to be prior art by inclusion in this section.

A geographic location of a mobile computing device can be determined using many different techniques including based either on Global Positioning System (GPS) data or on data associated with a wireless access point having a known location, such as a cellular base station or an 802.11 access point. For example, a mobile computing device may receive a GPS signal and responsively determine its position on the face of the Earth. In another example, a mobile computing device may receive a signal from either a cellular base station or an 802.11 access point. The location of the mobile computing device can be estimated based on the location of either the cellular base station or an 802.11 access point. In some cases, the relative signal strength and/or relative time delays from multiple wireless access points can be used to estimate the position of the mobile computing device relative to the wireless access points.

In some instances, the geographic location of a mobile computing device may be estimated using data and/or signals from multiple different networks that communicate with the mobile device. Once a geographic location of the computing device is estimated, location-based services can be provided to the mobile computing device based on the location of the mobile computing device. For instance, the computing device can generate location-sensitive information on a map, such as an indication of the current location of the computing device.

Some mobile computing devices may additionally or alternatively be equipped to allow for determining a usage context of the device based on information gathered by one or more sensors that are associated with the computing device. For example, data from one or more sensors on the device may be analyzed to determine that the user of the device is presently: watching television, driving a car, on a plane, riding a bicycle, walking to work, etc. Once a usage context is determined, the device behavior may be modified in accordance with the determined context. For instance, the user interface may be modified to facilitate user interaction with the device in a given context (e.g., voice commands may be activated while the user is driving).

BRIEF SUMMARY

In one example, a method is provided that includes receiving first sensor data from one or more sensors of a first computing device. The method also includes receiving second sensor data from one or more sensors of a second computing device. The method also includes determining, based on the first and second sensor data, that the first and second computing devices are colocated with one another. The method also includes identifying, based on the first sensor data, a context associated with the first computing device. The method also includes determining, based at least in part on the context associated with the first computing device, a context associated with the second computing device.

In another example, a method is provided that includes receiving first sensor data from one or more sensors of a first computing device. The method also includes receiving second sensor data from one or more sensors of a second computing device. The method also includes determining, based on the first and second sensor data, that the first and second computing devices are associated with complementary contexts. The method also includes determining, based at least in part on the determination that the first and second computing devices are associated with complementary contexts, that the first and second computing devices are colocated with one another.

In another example, a system is provided that includes a computing system including one or more processors. The system also includes a computer-readable medium having stored therein instructions that, when executed by the one or more processors of the computing system, cause the computing system to perform operations. The operations include receiving first sensor data from one or more sensors of a first computing device. The operations also include receiving second sensor data from one or more sensors of a second computing device. The operations also include determining, based on the first and second sensor data, that the first and second computing devices are colocated with one another. The operations also include identifying, based on the first sensor data, a context associated with the first computing device. The operations also include identifying, based at least in part on the context associated with the first computing device, a context associated with the second computing device.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a mobile computing device may be configured to perform a location determination based on data from one or more sensors on the device. Sensors providing location data may include a GPS receiver, a wireless access point, an accelerometer, etc. The computing device may be configured to provide location data moment to moment, and also store raw measurements from the sensors that are used to determine the location data. The raw measurement data that is collected and stored can be processed by the device in real time or in batches, depending on available computing resources. Moreover, the raw measurement data, or a compressed version thereof, may be communicated to a remote server, to enable the server to analyze the measurement data and perform a location determination. Such a remote server may further base a location determination on sensor data from additional sensors that may or may not be included on the mobile computing device, such as signal strength measurements from wireless access points and the like.

In addition to determining the location of a particular device, in some examples a group of mobile computing devices can be determined to be colocated with one another. In particular, a computing system such as remote server may determine that a group of devices that exhibit a sustained (e.g., non-transient) geographic proximity are colocated with one another. For example, a group of mobile devices that spatially track with one another and remain substantially within a particular separation distance of one another may be determined to be a colocated group of devices. In some cases, a remote server and/or a given mobile computing device (or group of such devices) may additionally or alternatively make a colocation determination based on engaging in short range device-to-device wireless communication with such other devices.

Within some examples a mobile computing device may be configured to determine a usage context (e.g., an activity a user of the device is engaged in) based on data from one or more sensors on the device. For example, a device may be associated with usage contexts such as: driving a vehicle, going for a run, watching television, having dinner, attending a meeting, etc. The computing device may be configured to provide context data from moment to moment, and also store raw measurement data and/or a compressed version thereof for subsequent analysis by the device and/or a remote server. The usage context determination may include identifying a best-matched usage profile to measurements from one or more environmental sensors and/or other activity-indicative data, such as user-specific information (e.g., calendar entries, agendas, scheduling correspondence, etc.). Moreover, in some examples, usage context determinations may be modified over time based on feedback to refine predictive models associated with particular usage contexts. In some examples, such modifications can be used to tune usage context determinations to a particular user or group of users to account for variations among different populations in modeling different usage contexts.

Complementary usage contexts, as used herein, refer to usage contexts corresponding to activities by that are generally carried out in close proximity of one another. For example, complementary usage contexts may be substantially identical, such as when users engage in the same activity while physically close to each other (e.g., riding bikes in a group, attending a movie together, riding in a vehicle together, taking a walk together, etc.). Other complementary usage contexts may differ from one another, yet still be associated with activities users carry out in close proximity of one another (e.g., a parent may be a spectator while their child participates in a sporting event in the same general location, etc.). Individuals located close to one another are relative more likely to be engaged in complementary activities and vice versa. Thus, devices colocated with one another are relatively more likely to be associated with complementary usage contexts. Similarly, devices associated with complementary usage contexts are relatively more likely to be colocated with one another.

In some examples described herein, estimates of a given device's location and/or usage context can be made based in part on the location(s) and/or usage context(s) of other devices deemed to be related to the given device. For example, a group of devices may be deemed to be related based on a determination that the devices are colocated with one another. The usage context of a given device in the group can then be estimated based in part on the usage context of one or more other devices in the group. In another example, a group of devices may be deemed to be related based on a determination that the devices in group are associated with mutually complementary usage contexts (e.g., the same usage contexts). The location of a given device in the group can then be estimated based at least in part on the location of one or more other devices in the group. In other words, a group of devices' colocation information and mutually complementary usage contexts can be used as proxies for better estimating one or the other for a given device in the group.

Figure 1:
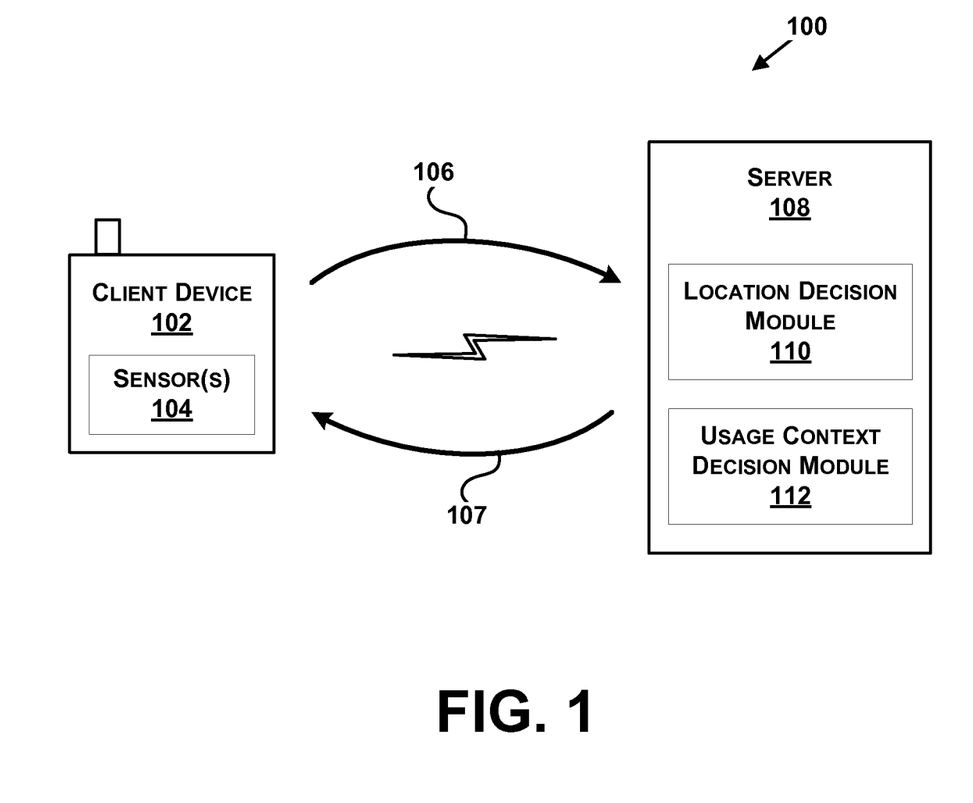
FIG. 1 illustrates an example communication system in which an example method may be implemented.

Referring now to the figures, FIG. 1 illustrates an example communication system 100 in which an example method may be implemented. In FIG. 1, a client device 102 may communicate with a server 108 via one or more wired and/or wireless interfaces. The client device 102 and the server 108 may communicate within a network. Alternatively, the client device 102 and the server 108 may each reside within a respective network.

The client device 102 may be any type of computing device or transmitter including a laptop computer, a mobile telephone, or tablet computing device, etc., that is configured to transmit data 106 to or receive data 107 from the server 108 in accordance with the method and functions described herein. The client device 102 may include a user interface, sensor(s) 104, a communication interface, a processor, and data storage comprising instructions executable by the processor for carrying out one or more functions relating to the data sent to, or received by, the server 108. The user interface may include buttons, a touchscreen, a microphone, and/or any other elements for receiving inputs, as well as a speaker, haptic feedback system, one or more displays, and/or any other elements for communicating outputs. The sensor(s) 104 may include devices and systems configured to generate data indicative of a location of the device 102, such as a GPS receiver or WiFi receiver and/or associated antenna structure and signal processor, an accelerometer, and/or other sensor(s) configured to generate location data. The sensor(s) 104 may be further configured to generate data indicative of a usage context associated with the device 102 (i.e., an activity that the user of the device 102 is engaged in).

The server 108 may be any entity or computing device arranged to carry out the method and computing device functions described herein. Further, the server 108 may be configured to send data 107 to or receive data 106 from the client device 102. The server 108 may include a location decision module 110 which may be configured to process the data 106 received from the client device 102 to determine a geographic location of the client device 102. The server 108 may also include a usage context decision module 112 which may be configured to process the data 106 received from the client device 102 to determine a present usage context associated with the device 102 (i.e., an estimate of an activity the user of the device 102 is engaged in). In some examples, location determinations and/or usage context determinations may be performed in whole or in part by a processing system included in the client device 102, based on data from the sensor(s) 104, information 107 from the server 108, and/or user inputs.

The data 106 received by the server 108 from the client device 102 may take various forms and can include data generated by the sensor(s). For example, the client device 102 may provide information indicative of an absolute or relative location of the client device 102, movement of the client device 102, or inputs from a user of the client device 102. The server 108 can then process the data 106 to identify a location and/or position history that matches the received data.

The data 107 sent to the client device 102 from the server 108 may take various forms as well. For example, the server 108 may send to the client device 102 an indication of location history (e.g., last known location), updated location history information, or information based on the locations of the device 102.

Figure 2:
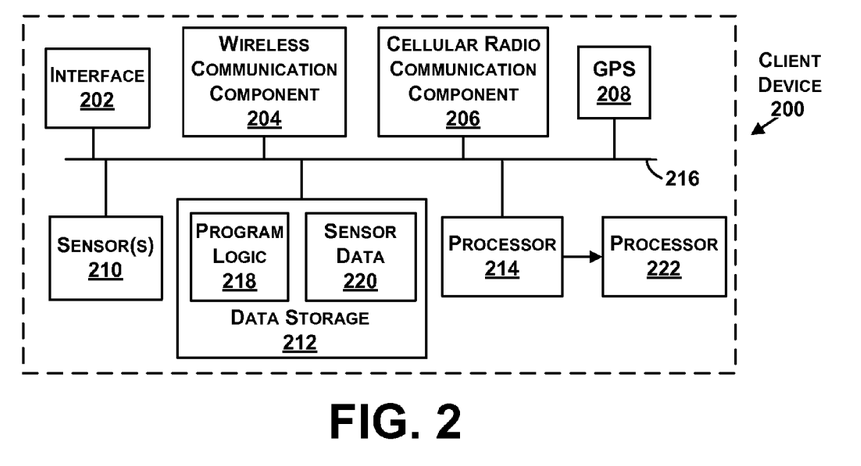
FIG. 2 illustrates a schematic drawing of an example device.

FIG. 2 illustrates a schematic drawing of an example device 200. In FIG. 2, the computing device takes a form of a client device 200. In some examples, some components illustrated in FIG. 2 may be distributed across multiple computing devices. However, for example purposes, the components are shown and described as part of a single client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include hardware to enable communication within the client device 200 and between the client device 200 and another computing device (not shown), such as a server entity. The communication hardware may include transmitters, receivers, and antennas, for example.

The communication interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs and/or convey outputs to/from a user.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 204, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless communication component 204 may be used to determine the identity of one or more wireless access points (e.g., by using a MAC address or other unique identifier) and measure an intensity of signals received (e.g., received signal strength indication) from each of the one or more wireless access points. The received signal strength indication from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signals from a cellular network. The cellular radio communication component 206 may also be configured to measure a round trip time to a base station providing the signal, and combine this information with the identified cell to determine a location estimate. In another example, the cellular communication component 206 may be configured to use observed time difference of arrival from more than one base station, such as three base stations, to estimate the location of the client device 200.

In still another instance, the processor 214 may use a location-determination algorithm to determine a location of the client device 200 based on signals sent by GPS satellites above the Earth. For example, the GPS 208 may be configured to estimate an absolute location of the mobile device 200 (and the local time) by precisely timing relative delays in signals received from the GPS satellites.

Additionally or alternatively, the processor 214 can use data from an accelerometer or other inertial sensor included in the sensor(s) 210 to refine and/or update a location determination based on subsequent and/or ongoing movement of the device 200.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200 or in communication with the client device 200. Example sensors include an accelerometer, gyroscope, pedometer, light sensors, microphone, camera, or other location and/or context-aware sensors.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or cellular technology, among other possibilities.

The client device 200 is illustrated to include an additional processor 222. The processor 222 may be configured to control other aspects of the client device 200 including displays or outputs of the client device 200. Example methods described herein may be performed individually by components of the client device 200, or in combination by one or all of the components of the client device 200. In one instance, portions of the client device 200 may process an audio signal and provide an output internally in the client device 200 to the processor 222, for example. In other instances, portions of the client device 200 may process an audio signal and provide outputs externally to other computing devices.

Figure 3:
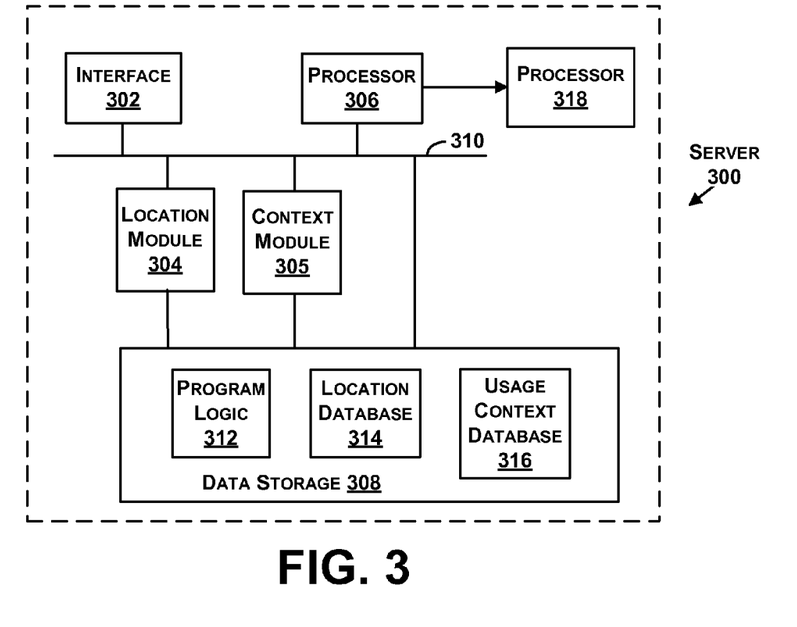
FIG. 3 illustrates a schematic drawing of another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of a single server 300. The server 300 may be a computing device, cloud, or similar entity that may be configured to perform the functions described herein.

The server 300 may include a communication interface 302, a location module 304, a context module 305, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine a geographic location of the client device. The determination may be based on outputs of one or more sensors of the client device, such as an accelerometer, gyroscope, GPS, wireless communication interface, or other sensors. The determination may also be based in whole or in part on location determinations made by the client device, which may themselves be based on user inputs among other examples. The location module 304 may further be configured to determine and store a history of locations of the client device, and to base location estimates on such location history. The location history for a given user may be stored in a location database 314 included in the data storage 308 to allow for future reference.

The context module 305 may be configured to receive data from a client device and determine a usage context associated with the client device (e.g., an activity in which a user of the client device is presently engaged). The determination may be based on outputs of one or more sensors of the client device, such as an accelerometer, gyroscope, GPS, wireless communication interface, temperature sensor, humidity sensor, microphone, camera, or other sensors of the client device. In some examples, the usage context module 305 may determine a usage context associated with the client device by comparing the received sensor data with multiple context usage profiles, and selecting a best-matching one according to a selection algorithm. Usage context profiles may include typical or expected sensor data while a user is engaged in particular activities, such as driving, golfing, watching television, working, etc. In some cases, data from multiple sensors can be combined in order to determine a particular usage context. Information indicative of usage context profiles may be stored in usage context database 316 in the data storage 308 to store indications of sensor output values associated with different usage contexts.

For example, a golfing usage context may be determined based on location data indicating the client device is at a golf course combined with accelerometer data consistent with the client device being carried by a user that is intermittently swinging a golf club and further combined with humidity readings indicating the client device is likely outdoors. In another example, a driving usage context may be determined based on locating data indicating the client device is traversing a path along a roadway combined with data indicating the client device is wirelessly connected via Bluetooth to a vehicle's hands free audio system. Moreover, some usage contexts may be determined substantially based on a single sensor. For example, an at work usage context may be determined based on data indicating the client device is connected to wireless access point located at the user's work. In some examples, usage context profiles may be developed and/or refined over time to match patterns in sensor data received from a particular user or from users in a particular group (e.g., employees of a given company, or users in a given geographic region, etc.). The determination of a particular usage context may also be based in whole or in part on determinations made by the client device, which may themselves be based on user inputs among other examples. The context module 305 may further be configured to determine and store a history of usage contexts of the client device, and to base usage context estimates on such usage context history. The usage context history for a given user may be stored in a usage context database 316 included in the data storage 308 to allow for future reference.

The data storage 308 may store program logic 312 that can be accessed and executed by the processor 306. The data storage 308 may also a location database 314 that can be accessed by the processor 306 as well, for example, to retrieve information regarding wireless access points, locations of satellites in a GPS network, floor plans of a building, etc., or any other type of information useful for determining a location of a client device. Additionally, the data storage 308 may also include the usage context database 316 that can be accessed by the processor 306 to retrieve information regarding expected sensor output values associated with different usage contexts. For example, the usage context database 316 may store multiple usage context profiles (e.g., expected sensor output values associated with different usage contexts), and may be updated and/or refined to match observed sensor values to different activities for a given user or group of users.

The server is illustrated with a second processor 318 which may be an application specific processor for input/output functionality. In other examples, functions of the processor 306 and the processor 318 may be combined into one component.

Within examples, measurements collected from various sensors of a device (such as WiFi components, GPS sensors, and inertial sensors) can be combined with information from external databases (such as known locations of WiFi access points or building floor plans) to estimate a location of the device in real-time. Recording the real-time location estimate at all times (or intervals/increments of time) produces a location history (e.g., a path of travel).

Within some examples, in addition to determining locations of individual devices, the server 300 can determine whether one or more devices are colocated with one another, which may be indicated by such devices having a sustained (e.g., non-transient) proximity with one another. For example, the processor 306 may determine that multiple devices are colocated by first determining location histories of the devices (via the location module 304) and storing such location histories in the location database 314. The processor 306 can then access the location database 314 to compare the location histories of various devices and identify particular ones with a sustained proximity substantially within a particular separation distance and conclude those devices are colocated with one another during the interval of sustained proximity. The processor 306 may also base colocation determinations on multiple devices following similar path of travel, as indicated by their location histories. Further still, the processor 306 may be configured to determine that particular devices are colocated based in whole or in part on such devices engaging in short range wireless communication with one another (e.g., via Bluetooth, or another ad-hoc point-to-point wireless communication technology). Indications of particular devices that are colocated with one another can be stored in the location database 314 for future retrieval.

Similarly, the server 300 may be used to determine that multiple devices are associated with complementary usage contexts (e.g., that the users of such devices are engaged in complementary activities). For example, the processor 306 may determine that multiple devices are associated with complementary usage contexts by first determining usage contexts of the devices over time (via the context module 305) and storing such usage context histories in the usage context database 316. The processor 306 can then access the usage context database 316 to compare the usage contexts of various devices and identify particular ones associated with complementary usage contexts during temporally overlapping periods. The processor 306 may thereby identify groups of devices that are associated with complementary usage contexts (e.g., common usage contexts) during common time intervals. Indications of groups of such devices that are associated with complementary usage contexts can be stored in the usage context database 314 for future retrieval.

Devices associated with complementary usage contexts are relatively more likely to be colocated with one another, because users engaged in complementary activities tend to be engaged in such activities together. Similarly, devices that are colocated are relatively more likely than others to be associated with complementary usage contexts, because users that are together tend to be engaged in complementary activities. As a result, the server 300 can be configured to use colocation information or complementary usage context information as proxies to inform estimates of one or the other.

For example, the server 300 may group together a first device and a second device based on the devices being colocated with one another. The server 300 can then determine a usage context to associate with the first device based in part on the usage context associated with the second device. The server 300 may, for example, select a usage context for the first device that is complementary to the usage context associated with the second device (e.g., the same usage context). The process can be used to estimate usage contexts when measurements received from the first device's sensors are incomplete, missing, ambiguous, or fail to correspond with one of the usage context profiles. Moreover, the procedure can be used to refine (e.g., tune) the library of usage context profiles associated with a particular user, group of users, or class of device to improve the accuracy of subsequent usage context determinations by the context module 305. For example, once the first device is associated with a particular usage context (e.g., based in part on the complementary usage context of the colocated second device), the usage context profile stored in the usage context data base 316 may be updated based on sensor measurements received from the first device. The stored usage context profile can be updated such that similar future measurements from the first device or other devices are recognized, via the context module 305, as indicative of the particular usage context.

Additionally or alternatively, the server 300 may group together a first device and a second device based on the devices being associated with complementary usage contexts (e.g., indicative of users of the two devices being engaged in complementary activities). The server 300 can then determine a location of the first device based in part on the location of the second device. The server 300 may, for example, estimate the location of the first device to be substantially the same as the location for the second device via the location module (e.g., as determined by the location module 304 based on measurements from sensors on the second device). The process may be used to estimate locations when location-indicative measurements received from first device's sensors are incomplete, missing, ambiguous, and/or if the second device is equipped with more or better location-indicative sensors and therefore able to generate data to allow for location determinations in situations that the first device is not. For example, device A may have Bluetooth and a cellular connection, and device B may have Bluetooth, GPS, and WiFi. Bluetooth (or another short-range device-to-device wireless communication protocol) is sufficient to determine co-location, so device A can determine it is near device B; but device A may not know its own location with great accuracy (e.g., cellular network based positioning is relatively low accuracy compared to GPS, for example). On the other hand, device B is equipped with GPS sensing capabilities and can therefore figure out its location via GPS. Meanwhile, a server receiving all the data (e.g., via cellular network from device A and via WiFi from device B) can thus figure out device A's location and communicate the determined location back to device A. Moreover, the procedure can be used to refine the algorithms employed by the location module 304 to enable greater accuracy in subsequent location determinations.

Figure 4:
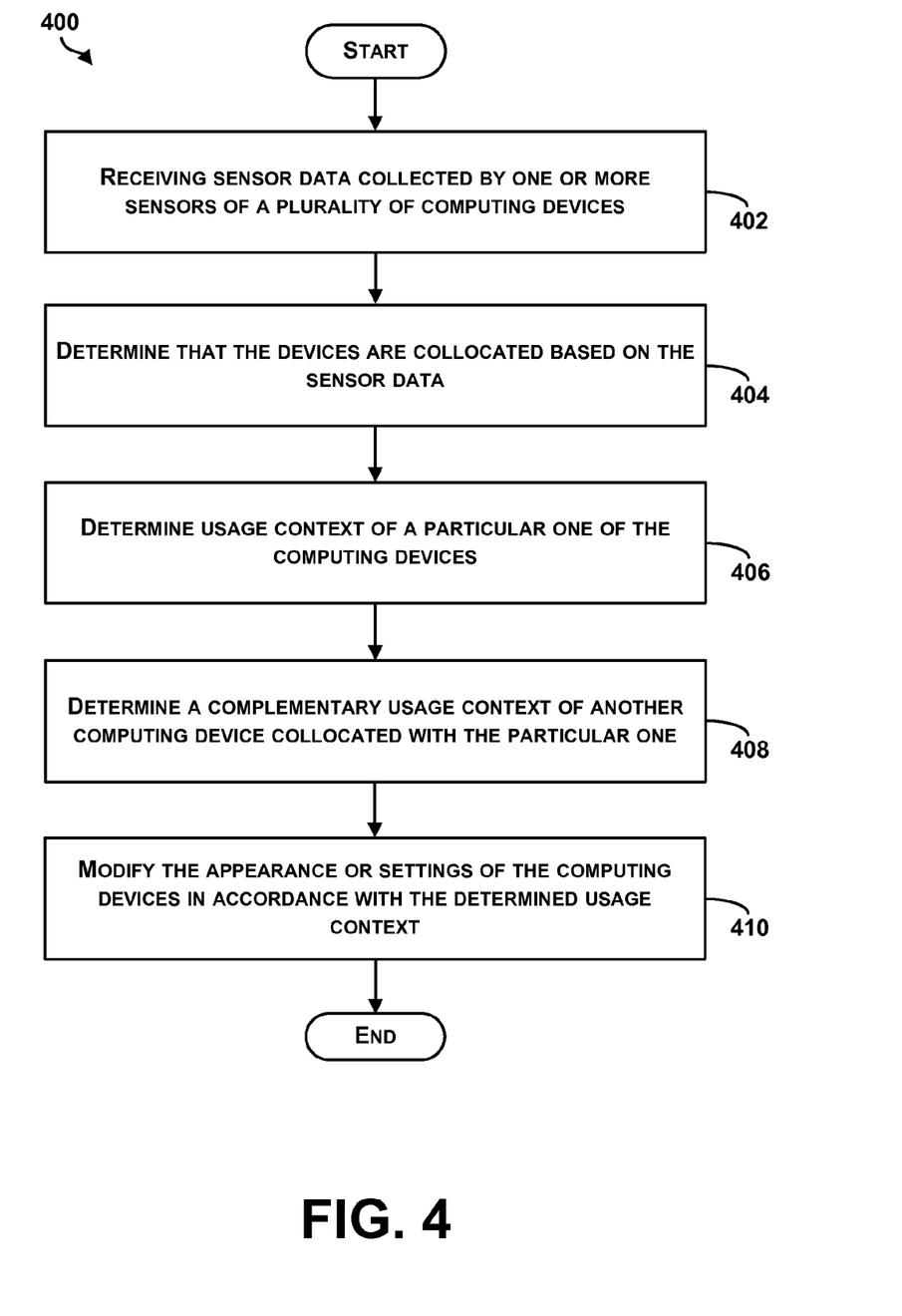
FIG. 4 is a block diagram of an example process 400 of determining a usage context of a device in a group of colocated devices based on a usage context of another device in the group.

FIG. 4 is a block diagram of an example process 400 of determining a usage context of a device in a group of colocated devices based on a usage context of another device in the group. Process 400 shown in FIG. 4 presents an embodiment of a method that, for example, could be carried out by a combination of hardware-implemented or software-implemented modules and used with the system 100 in FIG. 1, the device 200 in FIG. 2, or the server 300 in FIG. 3, for example, or may be performed by a combination of any components of the system 100 in FIG. 1, the device 200 in FIG. 2, or the server 300 in FIG. 3. Process 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the process 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the process 400 and other processes and methods disclosed herein, each block in FIG. 4 may represent circuitry that is wired to perform the specific logical functions in the process 400.

Functions of the process 400 may be fully performed by a computing device, or may be distributed across multiple computing devices and/or a server. In some examples, the computing device may receive information from sensors of the computing device, or where the computing device is a server the information can be received from another device that collects the information. The computing device could further communicate with a server to determine the matching media files, for example.

At block 402, the process 400 includes receiving sensor data collected by one or more sensors of a group of computing devices. Examples of sensor include data collected from one or more sensors including a WiFi sensor, a GPS sensor, an accelerometer, a gyroscope, or other inertial sensors of a computing device.

At block 404, the process 400 includes determining that the devices are colocated with one another. For example, block 404 may involve determining a location history of multiple devices in the group, comparing the location histories, and determining that a separation distance between the devices is below a minimum threshold during a sustained, non-transient interval. Block 404 may involve, for example, determining that the devices in the group traverse along a common path of travel, or remain present within a particular region of a structure, etc. In some examples, the individual locations (and location histories) can be determined for each device separately based on sensor measurements from each device. Additionally or alternatively, devices can be determined to be colocated with one another in block 404 based on data indicating the devices are engaged in sending and receiving signals between one another via a short-range point-to-point wireless communication technology or by data indicating the devices are connected to a common wireless access point.

At block 406, the process 400 includes determining a usage context associated with a particular one of the computing devices in the group. Block 406 may involve determining that the particular device is associated with one of several possible usage contexts by selecting a most-likely usage context that provides a best agreement with sensor measurements from the particular device. For example, the sensor measurements may be compared with expected/typical sensor measurements for multiple usage contexts, which information may be stored as usage context profiles, and may be particular to a given user, group of users, device, and/or class of devices, etc.

At block 408, the process 400 includes determining a complementary usage context of another computing device in the group (i.e., a computing device colocated with the particular computing device). Block 408 may involve selecting a usage context for the other computing device that is the same as the usage context of the particular computing device. Block 408 may also involve selecting a usage context that is complementary to the usage context of the particular computing device (e.g., a usage context predetermined to be commonly associated with a device colocated with a device associated the usage context determined in block 406). The complementary usage context may be selected by determining a most likely usage context among usage contexts that are complementary to the usage context determined in block 406.

At block 410, the process 400 may include modifying the appearance or settings of the computing device in accordance with the determined usage context. Block 410 may involve, for example, setting a ringtone, volume, display setting, and/or touch-screen icon size of the particular computing device and/or the other computing device. Such settings may be adjusted to facilitate the usage context associated with the computing devices in blocks 406 and 408. For example, in a case where the usage context of one or both devices is determined to be driving, the computing device may be adjusted to have enlarged touch-screen buttons that are easier to press and/or may be adjusted to employ a substantially hands-free user interface setting, such as using voice commands.

Figure 5:
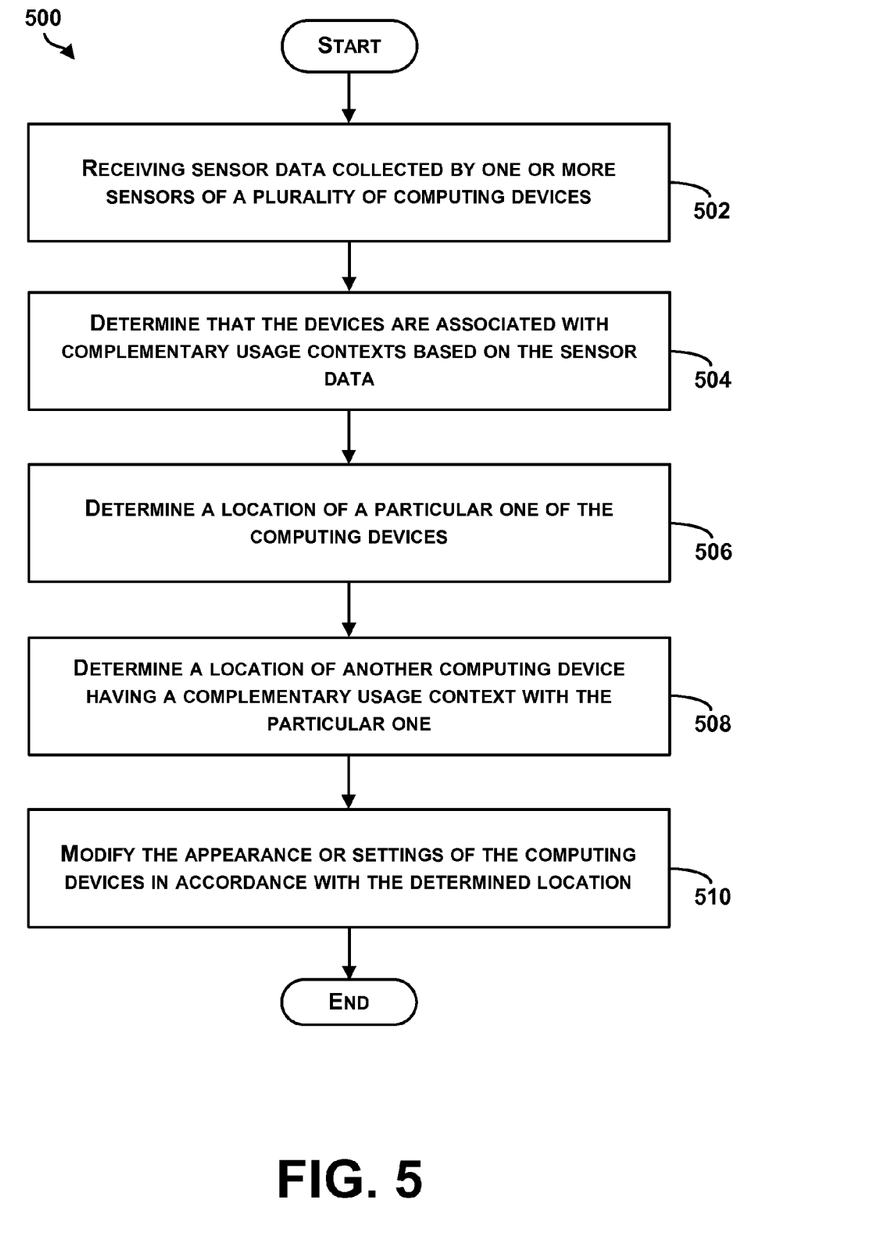
FIG. 5 is a block diagram of an example process 500 of determining a location of a device in a group of devices having complementary usage contexts based on a location of another device in the group.

FIG. 5 is a block diagram of an example process 500 of determining a location of a device in a group of devices having complementary usage contexts based on a location of another device in the group. Similar to process 400 of FIG. 4, process 500 shown in FIG. 5 presents an embodiment of a method that, for example, could be carried out by a combination of hardware-implemented or software-implemented modules and used with the system 100 in FIG. 1, the device 200 in FIG. 2, or the server 300 in FIG. 3, for example, or may be performed by a combination of any components of the system 100 in FIG. 1, the device 200 in FIG. 2, or the server 300 in FIG. 3. Process 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the process 500 includes receiving sensor data collected by one or more sensors of a group of computing devices. Examples of sensor include data collected from one or more sensors including a WiFi sensor, a GPS sensor, an accelerometer, a gyroscope, or other inertial sensors, a microphone, a humidity sensor, a temperature sensor, or other environmental sensors of a computing device.

At block 504, the process 500 includes determining that the devices are associated with complementary usage contexts. For example, block 504 may involve determining a usage context associated with multiple devices in the group, comparing the separately determined usage contexts, and determining that the usage contexts of the separate devices are complementary with one another (e.g., usage contexts predetermined to be commonly associated with devices colocated with one another, such as usage contexts corresponding to activities that users of such devices typically engaged in while in the presence of one another). Determining the individual usage contexts associated with a given device in the group may involve selecting a most likely one from multiple usage contexts based on agreement between sensor measurements from the device and the expected/typical sensor measurements for the usage context stored in a usage context profile, which profile may be tuned for a particular user, group of users, device, and/or class of devices. Block 504 may involve, for example, determining that the devices in the group are associated with a common usage context. In some examples, the common usage context may be a usage context commonly associated with a group activity, such as watching a show at a theater, riding public transportation, attending a meeting, eating in a restaurant, etc.

At block 506, the process 500 includes determining a location of a particular one of the computing devices in the group. Block 506 may involve determining that the particular device is located at a particular geographic location based on location-indicative data from sensors on the particular device (e.g., GPS data, signals to/from wireless access points, etc.).

At block 508, the process 500 includes determining a location of another computing device in the group (i.e., a computing device having a complementary usage context to the particular computing device). Block 508 may involve selecting a location that is substantially similar to the location determined in block 506 for the particular device. Block 508 may therefore involve assuming that the particular device is colocated with the other device in order to estimate the location of the other device. The location of the other device may also be determined by combining the location of the particular device with other information, including location-indicative data from the other device or from other sources (e.g., data indicative of wireless communication sessions engaged in by the other device from wireless access points, etc.).

Moreover, in some cases, block 508 may be preceded by a determination that the location of the other computing device cannot be resolved to within a predetermined accuracy using the sensor measurements collected by the other device. That is, if the sensor measurements from the other device allow for the location of the other device to be determined without reference to the location of the particular device, then block 508 of the process 500 may be omitted. Further still, the process 500 may include determining whether the other computing device generated any location indicative sensor measurements at all. If no such measurements are available, the other computing device may be assigned to the same location as determined in block 506 for the particular computing device.

At block 510, the process 500 may include modifying the appearance or settings of the computing device in accordance with the determined location. Block 510 may involve, for example, setting a current location on a map feature of the computing device or updating a time zone of the computing device, among other location-dependent settings and features. Such settings may be adjusted to facilitate operation of the computing devices in the locations identified in blocks 506 and 508.

Colocation information and complementary usage context information may be used as proxies for one another, as noted in FIGS. 4 and 5 to make estimates of one or the other. Moreover, once determinations are made, gathered sensor measurements (if any) may be used to refine usage context profiles so as to improve accuracy in usage context determinations. Methods 600 and 620 shown in FIGS. 6A-6B present embodiments of methods that, for example, could be used with the system 100 in FIG. 1, the device 200 in FIG. 2, or the server 300 in FIG. 3, for example, or may be performed by a combination of any components of the system 100 in FIG. 1, the device 200 in FIG. 2, or the server 300 in FIG. 3.

Figure 6A:
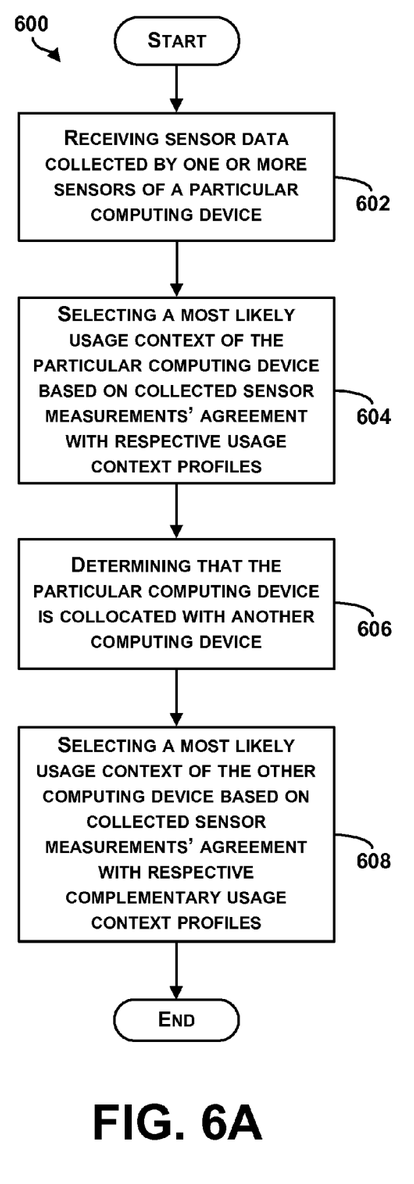
FIG. 6A is a block diagram of an example process to select a complementary usage context associated with a computing device based on the usage context associated with a colocated computing device.

FIG. 6A is a block diagram of an example process 600 to select a complementary usage context associated with a computing device based on the usage context associated with a colocated computing device. At block 602, the process 600 includes receiving sensor data collected by one or more sensors of a particular computing device. At block 604, the process 600 includes selecting a most likely usage context of the particular computing device based on collected sensor measurements' agreement with values indicated respective by usage context profiles. At block 606, the process 600 includes determining that the particular computing device is colocated with another computing device. Block 606 may involve receiving location-identifying data for the two computing devices and determining that the two exhibit a pattern of sustained proximity (i.e., are non-transiently within a particular separation distance). At block 608, the process 600 includes selecting a most likely usage context of the other computing device based on collected sensor measurements' agreement with values indicated by respective complementary usage context profiles.

Block 608 may further involve, for example, identifying a set of complementary usage context profiles that are predetermined to be complementary to the usage context associated with the particular computing device in block 604. The set of complementary usage contexts may be those usage contexts that correspond to activities commonly engaged in by users in the presence of others who are themselves engaged in an activity corresponding to the usage context of the particular computing device. Moreover, in some cases, block 608 may be preceded by a determination of whether the other computing device includes any usage context indicative sensor measurements. If no such measurements available, the other computing device may be assigned to the same usage context as determined in block 604 for the particular computing device. Alternatively, if sensor measurements are available, but are insufficient, by themselves, to select a usage context for the other device (e.g., similar to the procedure of block 604), the process 600 may involve using such measurements to select from the more limited set of complementary usage contexts.

Figure 6B:
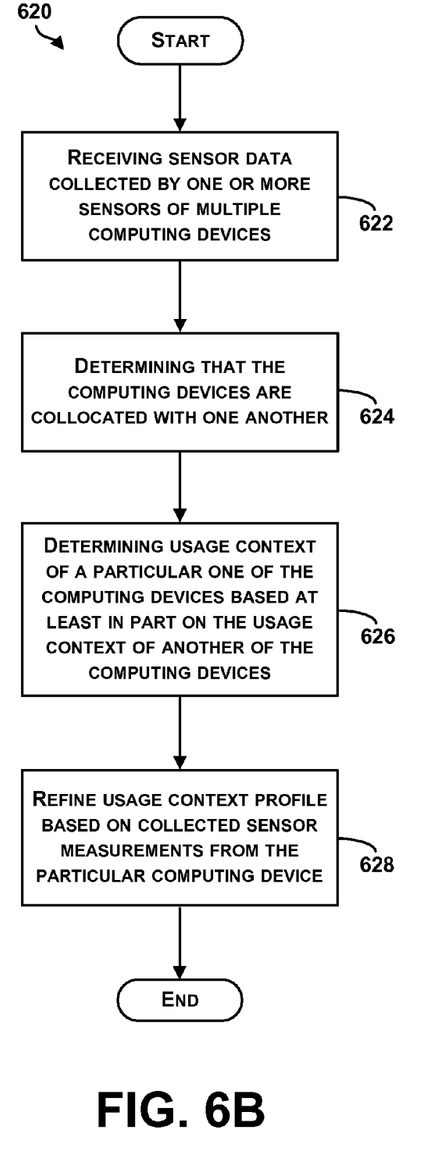
FIG. 6B is a block diagram of an example process to refine a usage context profile based on collected sensor measurements.

FIG. 6B is a block diagram of an example process 620 to refine a usage context profile based on collected sensor measurements. At block 622, the process 620 includes receiving sensor data collected by one or more sensors of multiple computing devices. At block 624, the process 620 includes determining that the computing devices are colocated with one another. At block 626, the process 620 includes determining the usage context of a particular one of the computing devices based at least in part on the usage context of another of the computing devices. Block 626 may involve selecting a best matching one of a set of complementary usage contexts based on the collected sensor measurements' agreement with expected values indicated by respective complementary usage context profiles. At block 628, the process 620 includes refining the usage context profiles based on collected sensor measurements from the particular computing device. Block 628 may involve updating the usage context profile to modify the expected values of sensor measurements for the usage context determined in block 626. Block 628 may involve, for example, updating the usage context profile so as to include the collected sensor measurements from the particular computing device within the range of expected values of sensor measurements for the usage context determined in block 626. In some cases, the usage context profile may be updated so as to be refined for the user of the particular computing device, a group of users including the user of the particular device, the particular device, and/or a class of devices including the particular device. Thus, the usage context profiles may be tuned, over time, to account for particularities in sensor measurements collected by different computing devices and by different users when engaged in similar activities (and therefore having devices desirably associated with substantially similar usage contexts).

Figure 7:
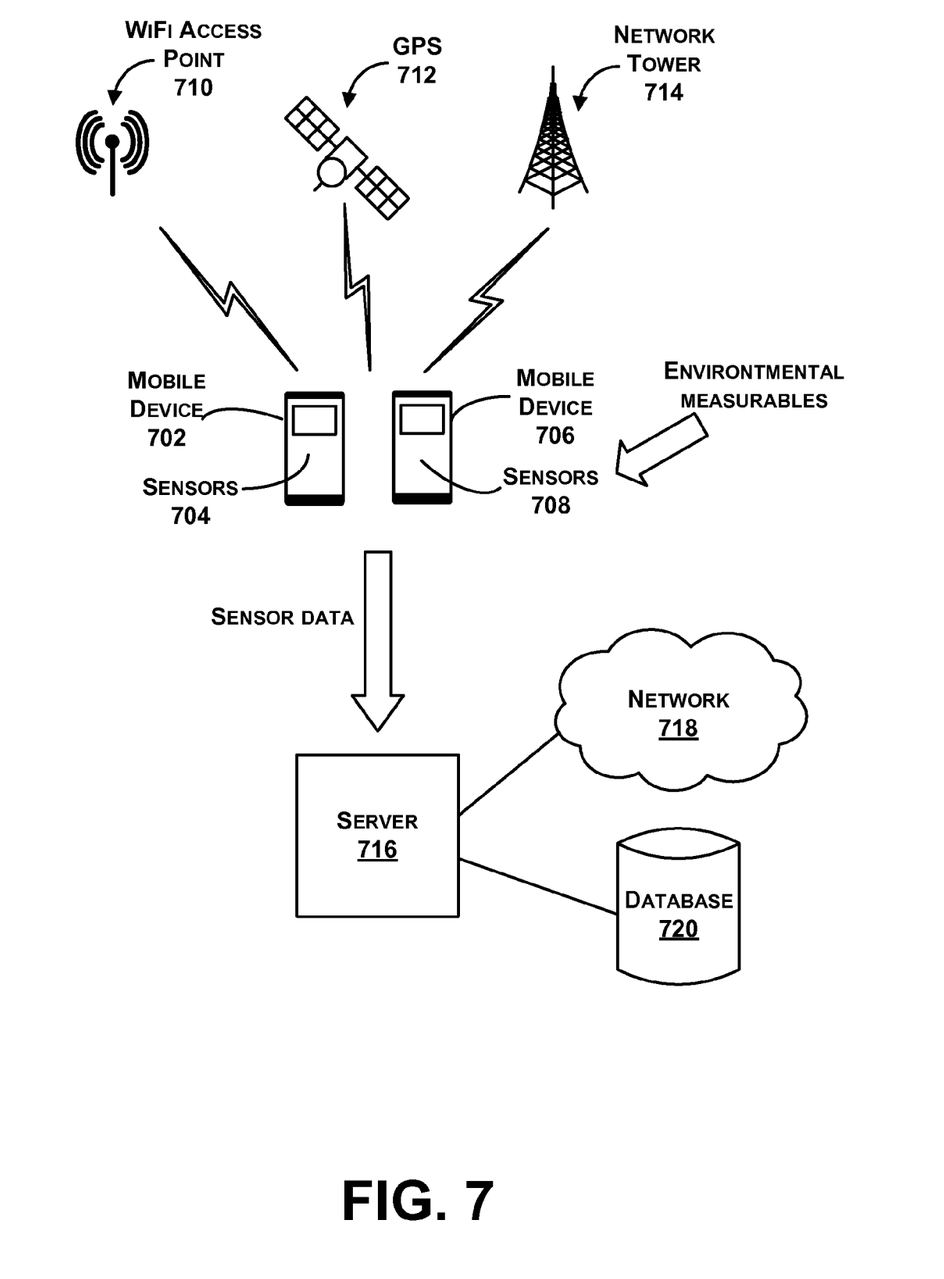
FIG. 7 is a block diagram of an example system configured to group devices together based on mutual colocation or usage context and estimate a usage context or a location of a device in the group.

FIG. 7 is a block diagram of an example system configured to group devices together based on mutual colocation or usage context and estimate a usage context or a location of a device in the group. The system includes mobile computing devices 702, 706 each configured to communicate with or detect a WiFi access point 710, a component of a GPS system 712, and/or a network tower 714. The mobile computing devices 702, 706 may further include sensors 704, 708. The sensors 704, 708 may include electronics, receivers, antennas, etc., for detecting and interpreting signals from the WiFi access point 710, GPS component 712, and/or network tower 714. The sensor 704, 708 may further include features for measuring environmental stimuli (e.g., temperature sensors, humidity sensors, cameras, ambient light sensors, microphones, noise level sensors, inertial sensors such as accelerometers, gyroscopes, etc., and other sensors for measuring environmental stimuli from the environment surrounding the mobile computing devices 702, 706. The mobile computing devices 702 may utilize any of the sensors 704 to determine a real-time instantaneous location and/or usage context of the device 702. The mobile computing device 706 can similarly utilize its sensors 708 to determine a real-time instantaneous location and/or usage context of the device 706. The mobile computing devices 702, 706 may additionally or alternatively store the collected sensor data or a compressed version thereof for further analysis by the devices 702, 706 or to communicate such sensor data to a remote location for further analysis.

The mobile computing devices 702, 706 may communicate with a server 716 to provide a copy of the collected sensor data. The server 716 may access a database 720 that stores location-determining information such as locations of WiFi access points, published data of GPS satellites, up-to-date geographical road maps, location history information for the devices 702, 706, etc., as well as usage-context-determining information such as usage context profiles, etc., and may access a network 718 to gain access to other external sources of information as well. The server 716 may be configured to perform processes to estimate usage contexts of a device based on a usage context of a colocated device, to estimate a location of a device based on a location of a device having a complementary usage context, and/or to update/refine usage context profiles based on collected sensor measurements (as shown in FIGS. 4-6).

Using methods and processes described herein, improved location information and usage context of a mobile computing device can be obtained. Such information allows a given computing device to be personalized (even optimized) for a given user's location and usage context. For example, location-based services can offer personalized recommendations and assistance based on places typically visited or activities engaged in, and the more accurate the location history and usage context information, the better these personalized systems will be.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving first sensor data from one or more sensors of a first computing device;
   receiving second sensor data from one or more sensors of a second computing device;
   determining, based on the first and second sensor data, that the first and second computing devices are colocated with one another;
   identifying, based on the first sensor data, a context associated with the first computing device;
   identifying, based at least in part on the context associated with the first computing device, a context associated with the second computing device; and
   responsive to identifying the context associated with the second computing device, updating one or more expected sensor measurement values associated with the identified context for use in a subsequent context identification, wherein the one or more expected sensor measurement values are updated based on the second sensor data,
   wherein the context associated with the first computing device, the context associated with the second computing device, and the subsequent context relate to one or more activities.

2. The method of claim 1, wherein identifying the context associated with the second computing device includes identifying a context that is complementary to the context associated with the first computing device.

3. The method of claim 1, wherein identifying the context associated with the second computing device includes associating the second computing device with the same context associated with the first computing device.

4. The method of claim 1,
   wherein identifying the context associated with the first computing device includes selecting a most probable one of a plurality of possible contexts based on the first sensor data, and wherein identifying the context associated with the second computing device includes selecting a most probable one of a subset of the plurality of possible contexts based on the second sensor data, wherein the subset includes contexts that are complementary to the context associated with the first computing device.

5. The method of claim 1,
wherein the one or more sensors of the first computing device includes a WiFi sensor, a GPS sensor, an accelerometer, or a gyroscope, and
wherein the one or more sensors of the second computing device includes a WiFi sensor, a GPS sensor, an accelerometer, or a gyroscope.

6. The method of claim 1, wherein the determination that the first and second computing devices are colocated includes (i) determining respective geographic locations of the first and second computing devices, and (ii) comparing the respective geographic locations to determine a separation distance between the first and second computing devices.

7. The method of claim 1, wherein the determination that the first and second computing devices are colocated includes determining that the first and second computing devices are non-transiently geographically proximate.

8. The method of claim 1, wherein the determination that the first and second computing devices are colocated includes determining that one of the first and second computing devices detects signals transmitted by the other of the first and second computing devices.

9. The method of claim 1, further comprising modifying a setting of the second computing device based on the context associated with the second computing device.

10. The method of claim 1, wherein the first sensor data is received by a server from the first computing device, the second sensor data is received by the server from the second computing device, and the server (i) determines that the first and second computing devices are colocated with one another, (ii) identifies the context associated with the first computing device, and (iii) identifies the context associated with the second computing device based, at least in part, on the context associated with the first computing device.

11. A system comprising:
a computing system including one or more processors; and
a computer-readable medium having stored therein instructions that, when executed by the one or more processors of the computing system, cause the computing system to perform operations comprising:
receiving first sensor data from one or more sensors of a first computing device;
receiving second sensor data from one or more sensors of a second computing device;
determining, based on the first and second sensor data, that the first and second computing devices are colocated with one another;
identifying, based on the first sensor data, a context associated with the first computing device;
identifying, based at least in part on the context associated with the first computing device, a context associated with the second computing device, and
responsive to identifying the context associated with the second computing device, updating one or more expected sensor measurement values associated with the identified context for use in a subsequent context identification, wherein the one or more expected sensor measurement values are updated based on the second sensor data,
wherein the context associated with the first computing device, the context associated with the second computing device, and the subsequent context relate to one or more activities.

12. The system of claim 11, wherein identifying the context associated with the second computing device includes identifying a context that is complementary to the context associated with the first computing device.

13. The system of claim 11,
wherein identifying the context associated with the first computing device includes selecting a most probable one of a plurality of possible contexts based on the first sensor data, and
wherein identifying the context associated with the second computing device includes selecting a most probable one of a subset of the plurality of possible contexts based on the second senor data, wherein the subset includes contexts that are complementary to the context associated with the first computing device.

14. The system of claim 11, wherein the determination that the first and second computing devices are colocated includes determining that the first and second computing devices are non-transiently geographically proximate.

\* \* \* \* \*